(12) United States Patent
Dawkins et al.

(10) Patent No.: US 8,935,568 B2
(45) Date of Patent: Jan. 13, 2015

(54) SYSTEM AND METHOD OF REPLICATING VIRTUAL MACHINES FOR LIVE MIGRATION BETWEEN DATA CENTERS

(75) Inventors: William P. Dawkins, Austin, TX (US); Gaurav Chawla, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 181 days.

(21) Appl. No.: 13/560,411

(22) Filed: Jul. 27, 2012

(65) Prior Publication Data

US 2014/0032959 A1    Jan. 30, 2014

(51) Int. Cl.
*G06F 11/00* (2006.01)

(52) U.S. Cl.
USPC ........................................ 714/6.3; 714/6.23

(58) Field of Classification Search
CPC ............ G06F 11/2023; G06F 11/2041; G06F 11/2048; G06F 11/2056
USPC .................... 714/6.3, 4.11, 6.21, 6.32, 10–13
See application file for complete search history.

(56) References Cited

U.S. PATENT DOCUMENTS

| | | | |
|---|---|---|---|
| 7,219,103 B2 | 5/2007 | Vasudevan et al. | |
| 7,389,300 B1* | 6/2008 | Shah et al. | 1/1 |
| 8,001,079 B2* | 8/2011 | Lu et al. | 707/616 |
| 8,195,777 B2* | 6/2012 | Hanai et al. | 709/221 |
| 8,271,830 B2* | 9/2012 | Erofeev | 714/6.23 |
| 2005/0041684 A1 | 2/2005 | Reynolds et al. | |
| 2005/0131965 A1 | 6/2005 | Lam et al. | |
| 2005/0251785 A1 | 11/2005 | Vertes et al. | |
| 2011/0302140 A1* | 12/2011 | Gokhale et al. | 707/645 |
| 2013/0326265 A1* | 12/2013 | Garai et al. | 714/6.3 |

OTHER PUBLICATIONS

"Virtual Machine Mobility with VMWare VMotion and Cisco Data Center Interconnect Technologies," Cisco vmware, 2009, pp. 1-17.

* cited by examiner

*Primary Examiner* — Dieu-Minh Le
(74) *Attorney, Agent, or Firm* — Larson Newman, LLP

(57) ABSTRACT

A method of replicating tiered data includes copying a volume from a first tiered storage array of a primary processing site to a second tiered storage array of a failover processing site, wherein the volume is tiered with a first tiered organization in both the first and second tiered storage arrays, directing from a first storage controller of the primary processing site that a second storage controller of the failover processing site stop tiering the volume on the second tiered storage array, changing the first tiered organization of the volume in the first tiered storage array to a second tiered organization, and changing the first tiered organization of the volume in the second tiered storage array to the second tiered organization.

20 Claims, 3 Drawing Sheets

SYSTEM AND METHOD OF REPLICATING VIRTUAL MACHINES FOR LIVE MIGRATION BETWEEN DATA CENTERS

FIELD OF THE DISCLOSURE

This disclosure relates generally to information handling systems, and relates more particularly to tiered data storage.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
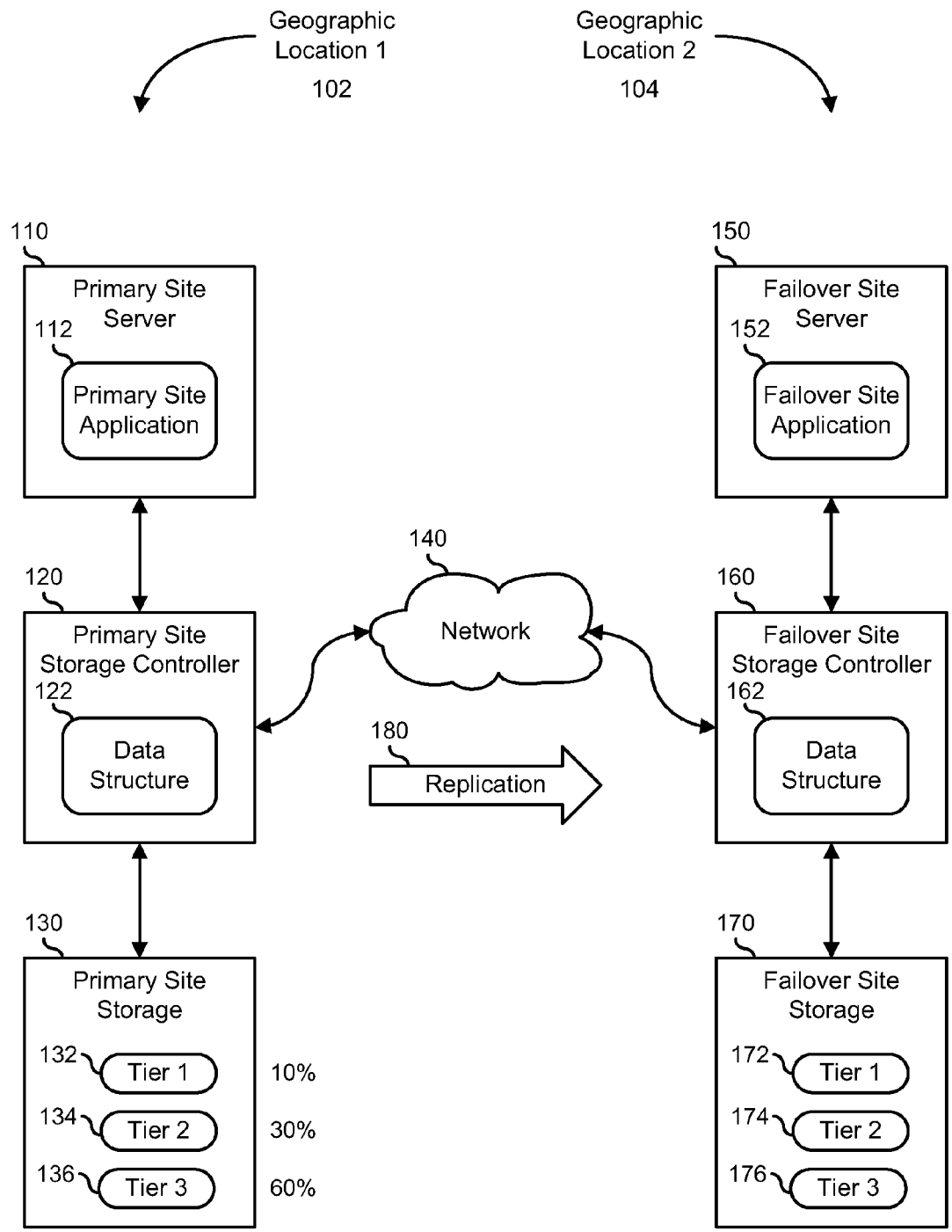
FIG. 1 is a block diagram of a geographically dispersed network according to an embodiment of the present disclosure.

FIG. 1 illustrates a geographically dispersed network 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

Geographically dispersed network 100 includes a primary geographic location processing site 102 and a failover geographic location processing site 104 that are connected together via a network 140 such as the Internet, a private network, another network, or a combination thereof. Primary site 102 includes a server 110, a storage controller 120, and a storage array 130. Server 110 includes an application 112. Storage controller 120 includes a data structure 122 that supports tiering operations, and is stored in a memory device in the storage controller. Storage array 130 includes storage devices 132, 134, and 136. Storage devices 132, 134, and 136 are labeled "Tier 1," "Tier 2," and "Tier 3," respectively, and can include other storage media. Server 110 is adapted to transfer data to and from storage array 130 via storage controller 120 over an interface such as a Small Computer System Interface (SCSI), a Peripheral Component Interconnect (PCI) Express interface, or another data communication interface.

Storage device 132 provides fast data access, storage device 134 provides medium data access, and storage device 136 provides slow data access. For example storage device 132 can be an NVRAM, one or more solid state drives (SSDs), another fast data access storage media, or a combination thereof. Similarly, storage device 134 can be a disk array made up of 15,000 RPM Serial Attach SCSI (SAS) hard disk drives (HDDs), other medium data access storage media, or a combination thereof. Moreover, storage device 136 can be a disk array made up of 7200 RPM Serial AT Attachment (SATA) HDDs, a tape storage device, another slow data access storage media, or a combination thereof. The terms fast-, medium-, and slow-data access are relative terms, and the actual data access speed will depend on the data access speeds of the respective storage devices 132, 134, and 136. Because storage device 132 is generally more expensive than storage devices 134 and 136, the storage capacity of storage device 132 is a small portion of the total storage capacity of storage array 130. For example storage device 132 can make up 10% of the total storage capacity of storage array 130, such as 10 terabytes out of a total of 100 terabytes. Storage device 134, being generally less expensive than storage device 132, but more expensive than storage device 136, has an intermediate portion of the total storage capacity of storage array 130. For example storage device 134 can make up 30% of the total storage capacity of storage array 130, or 30 terabytes. Finally storage device 136, being generally less expensive than either of storage devices 132 or 134, has the remainder of the total storage capacity of storage array 130. For example storage device 136 can make up 60% of the total storage capacity of storage array 130, or 60 terabytes.

In operation, storage controller 120 manages data storage for primary geographic location processing site 102 on storage array 130, performing memory reads and writes for server 110. Storage controller 120 presents the data stored in storage array 130 as a logical address range consisting of uniquely addressable contiguous locations. The address range provides server 110 with logical address ranges to which the server writes data, and from which the server reads data. The logical address range is representative of a logical unit accessible by server 110. For example the logical address range can represent a small logical unit associated with a mobile computing device or personal computer, such as a logical unit of 1 to 500 gigabytes, or the logical address range can represent a large storage logical unit associated with a large network server farm or data storage network, such as a logical unit of many terabytes, petabytes, or more.

Storage controller 120 divides the logical address range into a number of substantially equal sized chunks that each store data from a corresponding logical address range. Data structure 122 includes an access count for each chunk, including separate counts for the number of data reads and writes for each chunk. The access count is a tracking of the number of times each chunk is accessed for data reads and data writes in a particular amount of time, as for example in an hour, or in a day, or in another amount of time. Storage controller 120 operates to move files in storage array 130 between the tiers, based upon the access counts for each chunk. For example if storage controller 120 determines that the data in a particular chunk has not been accessed often in a particular amount of time, then the storage controller can move the chunk to a slower tier. Also if storage controller 120 determines that the data in another chunk has been accessed often in a particular amount of time, then the storage controller can move the chunk to a faster tier.

Application 112 operates on the data in storage array 130. For example application 112 can scan the data for viruses, archive unused or seldom used data to a long term storage system, back-up often used data to a back-up storage system, maintain data consistency between storage devices 132, 134, and 136 and a mirror data storage system, another data operation, or a combination thereof. Additionally, application 112 operates to provide a service to a particular client or customer. For example application 112 can represent a hosted web service, a database service, a content delivery service, an electronic commerce service, another client service, or a combination thereof. As such application 112 operates to proved the service in accordance with an agreed upon service level agreement (SLA) that defines a level of quality of service provided by the application to the client or customer. For example an SLA can define a number of page hits that can be handled by a hosted web service, an access time for a database service, a content throughput level for a content delivery service, a service availability for an electronic commerce service, another measure of quality of service for another client service, or a combination thereof. In a particular embodiment, the ability of application 112 to meet the SLA is predicated on the availability of frequently used data being available to the application in a timely manner. As such, storage controller 120 operates to ensure that the data is being stored in the tiers in a way that permits application 112 to meet the SLA.

Failover site 104 includes a server 150 similar to server 110, a storage controller 160 similar to storage controller 120, and a storage array 170 similar to storage array 130. Server 150 includes an application 152 similar to application 112. Storage controller 160 includes a data structure 162 similar to data structure 122 that supports tiering operations, and is stored in a memory device in the storage controller. Storage array 170 includes storage devices 172, 174, and 176 that are similar to storage devices 132, 134, and 136, and that are labeled "Tier 1," "Tier 2," and "Tier 3," respectively. Failover site 104 operates similarly to primary site 102.

Failover site 104 operates as a geographically remote backup and failover site to primary site 102. As such, primary site 102 operates to replicate 180 itself onto failover site 104, so that in the event of an emergency, or when the primary site is undergoing maintenance, the operation of application 112 is carried out by the failover site without a disruption in the services provided by the application. In particular, the data stored on storage array 130 is mirrored onto storage array 170, and application 112 is copied onto server 150 via network 140. Here, storage controller 120 provides the data from storage array 130 to storage controller 160 which stores the data on storage array 170. In a particular embodiment the data is provided synchronously, such that when the data is changed in storage array 130, the changes are provided by storage controller 120 to storage controller 160 for storage on storage array 170. In another embodiment the data is provided asynchronously, such that the changes that have accumulated over a period of time are provided by storage controller 120 to storage controller 160 for storage on storage array 170. For example the changes can be provided at times when the data handling load of storage controllers 120 and 160 are low, or when data traffic on network 140 is low.

In a particular embodiment, storage controller 160 stores the data received from primary site 102 in the same way as the operational data of failover site 104. Here, when there is no failover or maintenance condition, because the data as stored in storage array 170 is not being accessed, the tiering operation of storage controller 160 will serve to move all of the data into storage device 176, the tier 3 storage. Thus when a failover or maintenance condition occurs and the copy of application 112 is launched, the data is available to the application. However because the data in failover site 104 is stored in storage device 176, there is a period of time when the SLA is not met, because of the slower access time to access the data. In time the more frequently accessed data will migrate into storage devices 172 and 174, and application 112 running on failover site 104 will meet the SLA. However, the failure to meet the SLA during the interim when the data is migrating may be deemed to be unacceptable.

In another embodiment, storage controller 160 receives an indication to store the data from primary site 102 in storage array 170 in the same way as the data is stored in storage array 130, and that the storage controller is to disable tiering for the data. Here, when there is no failover or maintenance condition, although the data as stored in storage array 170 is not being accessed, the tiered organization of the data remains intact. Thus when a failover or maintenance condition occurs and the copy of application 112 is launched, the data is available to the application in the same way that the data was presented in storage array 130. Thus there is no period of time when the SLA is not met. The skilled artisan will recognize that for a different application running on failover site 104, primary site 102 can operate as the failover site, as needed or desired.

Figure 2:
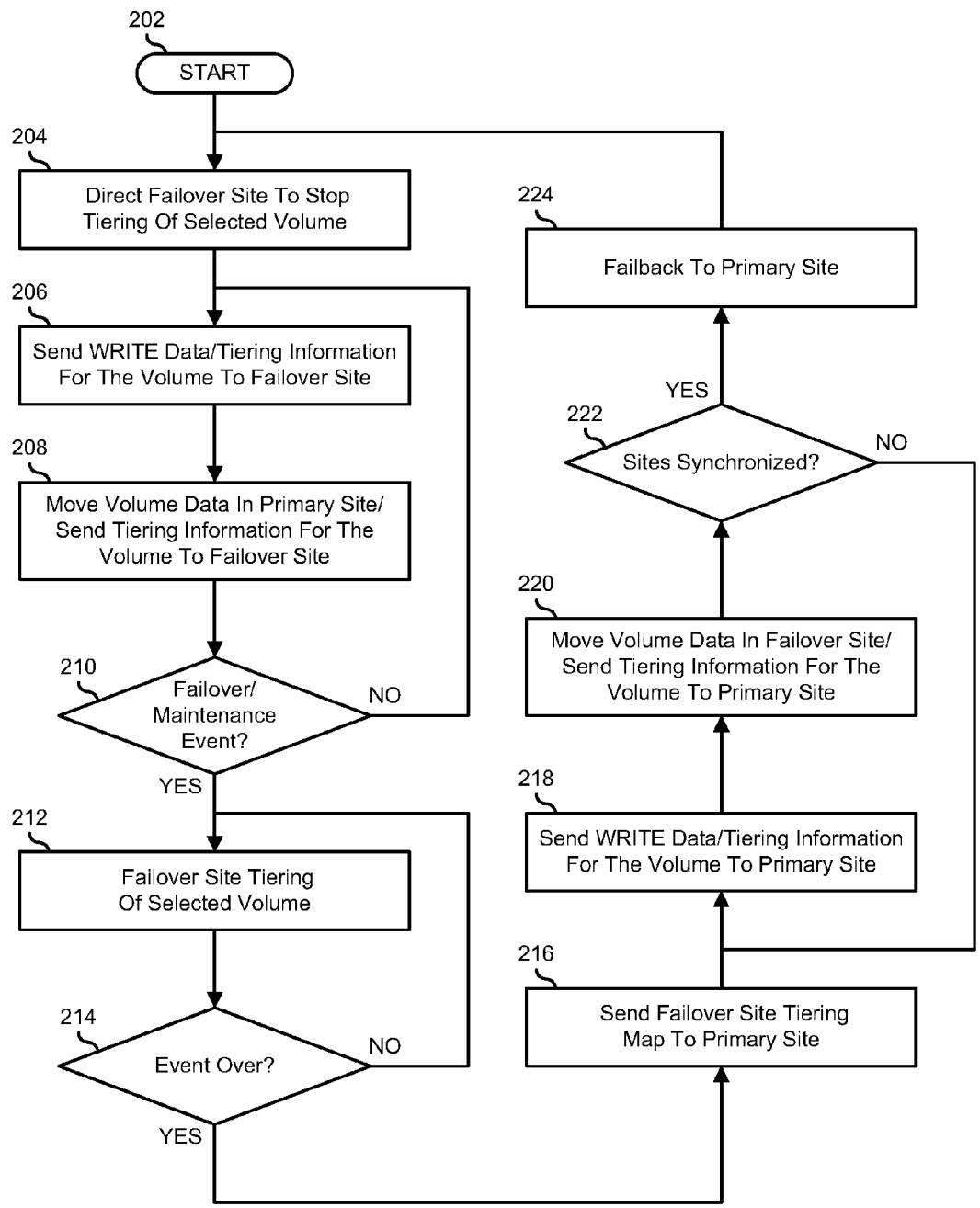
FIG. 2 is a flow diagram of a method of replicating the tiered organization of data stored in a primary processing site in the storage array of a failover processing site according to an embodiment of the present disclosure.

FIG. 2 illustrates a method of replicating the tiered organization of data stored in a primary processing site in the storage array of a failover processing site, beginning at block 202. A particular volume of data associated with an application executed on the primary processing site is replicated on the failover processing site, and the failover site is directed to stop tiering operations on the volume of data in block 204. For example a volume of a storage array of the primary processing site that is associated with an application can be replicated in a storage array of the failover site, including the tiered organization of the volume. When the volume is replicated in the failover site storage array, the primary site storage controller can direct the failover site storage controller to stop tiering operations on the volume. In a particular embodiment, the primary site storage controller can associate itself as the agent for directing the failover site storage controller on how and when to perform tiering operations on the volume.

In block 206, when the primary site storage controller writes data to the volume in the primary site storage array, the primary site storage controller sends the write data to the failover site storage controller, and the failover site storage controller writes the write data to the failover site storage array. In addition, the primary site storage controller sends tiering information associated with the write data to the failover site storage controller, so that the failover site storage controller can store the write data in the correct tiers of the failover site storage array. In a particular embodiment, the tiering information is sent in-band with the write data. For example the write data can include metadata that indicates to which tier the write data is to be stored. In another embodiment, the tiering information is sent out-of-band, or separately from the write data. Here the tiering information can be sent before the write data, so that the failover site storage controller can directly store the write data to the correct tier. Otherwise the write data can be sent before the tiering information. Here, the write data can be temporarily stored in the failover site storage array, and at a convenient time, when the tiering information is received, the failover site storage controller can move the write data to the correct tier.

In block 208, when, based upon the access data for the volume, the primary site storage controller moves data between tiers of the primary site storage array, the primary site storage controller sends tiering information associated with the move to the failover site storage controller, so that the failover site storage controller can move the associated data to the correct tiers of the failover site storage array. As described above, the tiering information can be sent as an in-band message, or as out-of-band message. In a particular embodiment, the execution of blocks 206 and 208 are performed as the writes and moves of data within the primary site storage array occur, such that the primary site storage array and the failover site storage array are synchronously maintained and updated. In another embodiment, the primary site storage controller will collect information about the writes and moves of data within the primary site storage array as they occur, and then, at a predetermined interval, the primary site storage controller will issue an update command to the failover site storage controller. The update command includes a map showing how the volume is distributed among the tiers. When the failover site storage controller will move the data in the volume to the correct tiers, as described by the map.

A decision is made as to whether or not a failover event or a maintenance event has occurred in the primary processing site in decision block 210. If not, the "NO" branch of decision block 210 is taken, and the method returns to loop through blocks 206 and 208 where the failover processing site is updated with write data from the primary processing site, and with the tiering information needed to maintain the tiered organization for the volume. If a failover event or a maintenance event has occurred in the primary processing site, the "YES" branch of decision block 210 is taken, and the method proceeds to block 212 where the failover site storage controller detects the failover event or maintenance event, and begins to perform tiering operations on the volume. The skilled artisan will understand that that the application is also launched on the failover processing site in response to a failover event or a maintenance event.

A decision is made as to whether or not the failover event or maintenance event is over in decision block 214. If not, the "NO" branch of decision block 214 is taken and the method returns to block 212 where the failover site storage controller begins to perform tiering operations on the volume. If the failover event or maintenance event is over, the "YES" branch of decision block 214 is taken, and the failover site storage controller sends a map of the current tiered organization of the volume to the primary site storage controller in order to begin synchronizing the volume between the primary site storage array and the failover site storage array.

In block 218, when the failover site storage controller writes data to the volume in the failover site storage array, the failover site storage controller sends the write data to the primary site storage controller, and the primary site storage controller writes the write data to the primary site storage array. In addition, the failover site storage controller sends tiering information associated with the write data to the primary site storage controller, so that the primary site storage controller can store the write data in the correct tiers of the primary site storage array. As described above, the tiering information can be sent as an in-band message, or as out-of-band message.

In block 220, when, based upon the access data for the volume, the failover site storage controller moves data between tiers of the failover site storage array, the failover site storage controller sends tiering information associated with the move to the primary site storage controller, so that the primary site storage controller can move the associated data to the correct tiers of the primary site storage array. As described above, the tiering information can be sent as an in-band message, or as out-of-band message. Also, as described above, the execution of blocks 218 and 220 can be performed such that the primary site storage array and the failover site storage array are synchronously maintained and updated, or the blocks 218 and 220 can be performed at a predetermined interval based upon a map showing how the volume is distributed among the tiers.

A decision is made as to whether or not the primary processing site and the failover processing site are synchronized in decision block 222. If not, the "NO" branch of decision block 222 is taken, and the method returns to loop through blocks 218 and 220 where the primary processing site is updated with write data from the failover processing site, and with the tiering information needed to maintain the tiered organization for the volume until the sites are synchronized. If the primary processing site and the failover processing site are synchronized, the "YES" branch of decision block 222 is taken, the application is failed back to the primary processing site in block 224, and the method repeats, starting again with block 204.

Figure 3:
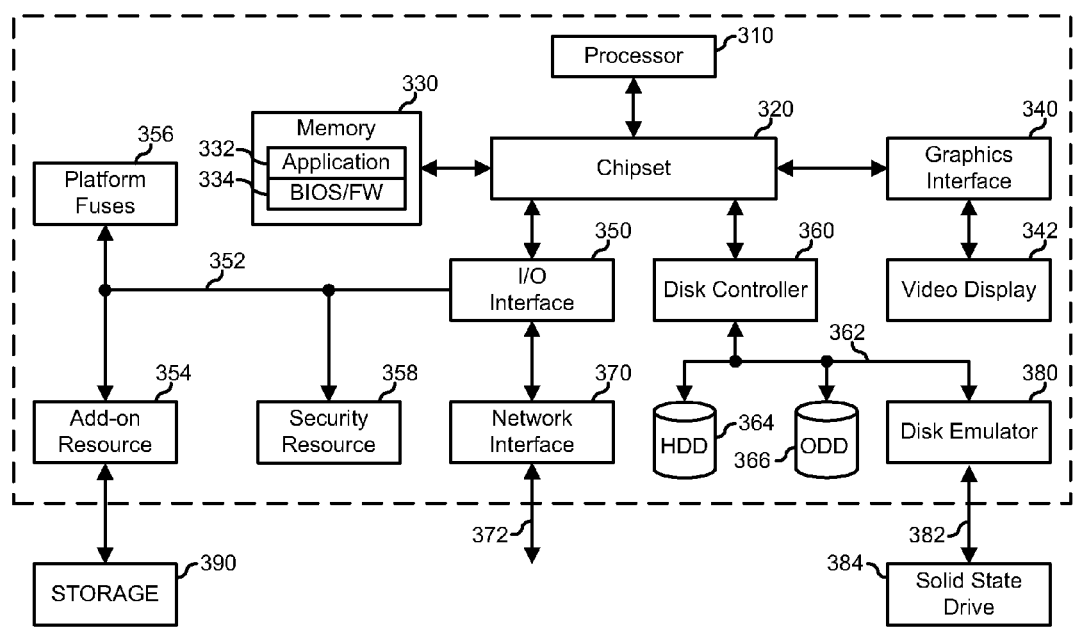
FIG. 3 is a functional block diagram illustrating an exemplary embodiment of an information handling system.

FIG. 3 is a block diagram illustrating an embodiment of an information handling system 300, including a processor 310, a chipset 320, a memory 330, a graphics interface 340, an input/output (I/O) interface 350, a disk controller 360, a network interface 370, and a disk emulator 380. In a particular embodiment, information handling system 300 is used to carry out one or more of the methods described herein. In another embodiment, one or more of the systems described herein are implemented in the form of information handling system 300.

Chipset 320 is connected to and supports processor 310, allowing the processor to execute machine-executable code. In a particular embodiment, information handling system 300 includes one or more additional processors, and chipset 320 supports the multiple processors, allowing for simultaneous processing by each of the processors and permitting the exchange of information among the processors and the other elements of the information handling system. Chipset 320 can be connected to processor 310 via a unique channel, or via a bus that shares information among the processor, the chipset, and other elements of information handling system 300.

Memory 330 is connected to chipset 320. Memory 330 and chipset 320 can be connected via a unique channel, or via a bus that shares information among the chipset, the memory, and other elements of information handling system 300. In another embodiment (not illustrated), processor 310 is connected to memory 330 via a unique channel. In another embodiment (not illustrated), information handling system 300 includes separate memory dedicated to each of the one or more additional processors. A non-limiting example of memory 330 includes static random access memory (SRAM), dynamic random access memory (DRAM), non-volatile random access memory (NVRAM), read only memory (ROM), flash memory, another type of memory, or any combination thereof.

Graphics interface 340 is connected to chipset 320. Graphics interface 340 and chipset 320 can be connected via a unique channel, or via a bus that shares information among the chipset, the graphics interface, and other elements of information handling system 300. Graphics interface 340 is connected to a video display 342. Other graphics interfaces (not illustrated) can also be used in addition to graphics interface 340 as needed or desired. Video display 342 includes one or more types of video displays, such as a flat panel display, another type of display device, or any combination thereof.

I/O interface 350 is connected to chipset 320. I/O interface 350 and chipset 320 can be connected via a unique channel, or via a bus that shares information among the chipset, the I/O interface, and other elements of information handling system 300. Other I/O interfaces (not illustrated) can also be used in addition to I/O interface 350 as needed or desired. I/O interface 350 is connected via an I/O interface 352 to one or more add-on resources 354. Add-on resource 354 is connected to a storage system 390, and can also include another data storage system, a graphics interface, a network interface card (NIC), a sound/video processing card, another suitable add-on resource or any combination thereof. I/O interface 350 is also connected via I/O interface 352 to one or more platform fuses 356 and to a security resource 358. Platform fuses 356 function to set or modify the functionality of information handling system 300 in hardware. Security resource 358 provides a secure cryptographic functionality and includes secure storage of cryptographic keys. A non-limiting example of security resource 358 includes a Unified Security Hub (USH), a Trusted Platform Module (TPM), a General Purpose Encryption (GPE) engine, another security resource, or a combination thereof.

Disk controller 360 is connected to chipset 320. Disk controller 360 and chipset 320 can be connected via a unique channel, or via a bus that shares information among the chipset, the disk controller, and other elements of information handling system 300. Other disk controllers (not illustrated) can also be used in addition to disk controller 360 as needed or desired. Disk controller 360 includes a disk interface 362. Disk controller 360 is connected to one or more disk drives via disk interface 362. Such disk drives include a hard disk drive (HDD) 364, and an optical disk drive (ODD) 366, and can include one or more disk drive as needed or desired. ODD 366 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 360 is connected to disk emulator 380. Disk emulator 380 permits a solid-state drive 384 to be coupled to information handling system 300 via an external interface 382. External interface 382 can include industry standard busses such as USB or IEEE 1394 (Firewire) or proprietary busses, or any combination thereof. Alternatively, solid-state drive 384 can be disposed within information handling system 300.

Network interface device 370 is connected to I/O interface 350. Network interface 370 and I/O interface 350 can be coupled via a unique channel, or via a bus that shares information among the I/O interface, the network interface, and other elements of information handling system 300. Other network interfaces (not illustrated) can also be used in addition to network interface 370 as needed or desired. Network interface 370 can be a network interface card (NIC) disposed within information handling system 300, on a main circuit board such as a baseboard, a motherboard, or any combination thereof, integrated onto another component such as chipset 320, in another suitable location, or any combination thereof. Network interface 370 includes a network channel 372 that provide interfaces between information handling system 300 and other devices (not illustrated) that are external to information handling system 300. Network interface 370 can also include additional network channels (not illustrated).

Information handling system 300 includes one or more application programs 332, and Basic Input/Output System and Firmware (BIOS/FW) code 334. BIOS/FW code 334 functions to initialize information handling system 300 on power up, to launch an operating system, and to manage input and output interactions between the operating system and the other elements of information handling system 300. In a particular embodiment, application programs 332 and BIOS/FW code 334 reside in memory 330, and include machine-executable code that is executed by processor 310 to perform various functions of information handling system 300. In another embodiment (not illustrated), application programs and BIOS/FW code reside in another storage medium of information handling system 300. For example application programs and BIOS/FW code can reside in HDD 364, in a ROM (not illustrated) associated with information handling system 300, in an option-ROM (not illustrated) associated with various devices of information handling system 300, in storage system 390, in a storage system (not illustrated) associated with network channel 372, in another storage medium of information handling system 300, or a combination thereof. Application programs 332 and BIOS/FW code 334 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example a portion of an information handling system device may be hardware such as, for example an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method of replicating tiered data, the method comprising:
    copying a volume from a first tiered storage array of a primary processing site to a second tiered storage array of a failover processing site, wherein the volume is tiered with a first tiered organization in both the first and second tiered storage arrays;
    directing from a first storage controller of the primary processing site that a second storage controller of the failover processing site stop tiering the volume on the second tiered storage array;
    changing the first tiered organization of the volume in the first tiered storage array to a second tiered organization;
    changing the first tiered organization of the volume in the second tiered storage array to the second tiered organization;
    detecting an event at the primary processing site;
    initiating tiering of the volume by the second storage controller in response to the event;
    changing the second tiered organization of the volume in the second tiered storage array to a third tiered organization;
    detecting an end to the event at the primary processing site; and
    changing the second tiered organization of the volume in the first tiered storage array to the third tiered organization in response to detecting the end of the event.

2. The method of claim 1, further comprising:
    directing from the first storage controller that the second storage controller change the first tiered organization of the volume in the second tiered storage array to the second tiered organization in response to changing the first tiered organization of the volume in the first tiered storage array;
    wherein changing the first tiered organization of the volume in the second tiered storage array to the second tiered organization is in response to the direction from the first storage controller.

3. The method of claim 2, wherein directing the second storage controller to change the first tiered organization to the second tiered organization is performed in response to a first predetermined interval at the first storage controller.

4. The method of claim 1, wherein:
    changing the first tiered organization comprises writing data to the volume;
    the method further comprises sending the data to the second storage controller prior to changing the first tiered organization of the volume in the second tiered storage array to the second tiered organization.

5. The method of claim 1, wherein the event includes at least one of a maintenance event and a failover event.

6. The method of claim 1, further comprising:
    directing from the second storage controller that the first storage controller change the second tiered organization of the volume in the first tiered storage array to the third tiered organization in response to changing the second tiered organization of the volume in the second tiered storage array;
    wherein changing the second tiered organization of the volume in the first tiered storage array to the third tiered organization is in response to the direction from the second storage controller.

7. The method of claim 6, wherein directing the first storage controller to change the second tiered organization to the third tiered organization is performed in response to a second predetermined interval at the second storage controller.

8. The method of claim 6, further comprising:
    determining that the first and second tiered storage arrays are synchronized in response to changing the second

11 tiered organization of the volume in the first tiered storage array to the third tiered organization;
initiating tiering of the volume by the first storage controller in response to the determining; and
directing from the first storage controller that the second storage controller stop tiering the volume.

9. A non-transitory computer-readable medium including code to perform a method of replicating tiered data, the method comprising:
copying a volume from a first tiered storage array of a primary processing site to a second tiered storage array of a failover processing site, wherein the volume is tiered with a first tiered organization in both the first and second tiered storage arrays;
directing from a first storage controller of the primary processing site that a second storage controller of the failover processing site stop tiering the volume on the second tiered storage array;
changing the first tiered organization of the volume in the first tiered storage array to a second tiered organization;
directing from the first storage controller that the second storage controller change the first tiered organization of the volume in the second tiered storage array to the second tiered organization in response to changing the first tiered organization of the volume in the first tiered storage array;
changing the first tiered organization of the volume in the second tiered storage array to the second tiered organization in response to the direction from the first storage controller;
changing the second tiered organization of the volume in the second tiered storage array to a third tiered organization;
detecting an end to an event at the primary processing site; and
directing from the second storage controller that the first storage controller change the second tiered organization of the volume in the first tiered storage array to the third tiered organization in response to changing the second tiered organization of the volume in the second tiered storage array; and
changing the second tiered organization of the volume in the first tiered storage array to the third tiered organization in response to detecting the end of the event in response to the direction from the second storage controller.

10. The computer-readable medium of claim 9, wherein directing the second storage controller to change the first tiered organization to the second tiered organization is performed in response to a first predetermined interval at the first storage controller.

11. The computer-readable medium of claim 9, the method further comprising:
detecting an event at the primary processing site; and
initiating tiering of the volume by the second storage controller in response to the event.

12. The computer-readable medium of claim 9, wherein directing the first storage controller to change the second tiered organization to the third tiered organization is performed in response to a second predetermined interval at the second storage controller.

13. The computer-readable medium of claim 9, the method further comprising:
determining that the first and second tiered storage arrays are synchronized in response to changing the second tiered organization of the volume in the first tiered storage array to the third tiered organization;

12 initiating tiering of the volume by the first storage controller in response to the determining; and
directing from the first storage controller that the second storage controller stop tiering the volume.

14. A storage controller comprising:
a memory; and
a processor operable to:
copy a volume from a first tiered storage array of a primary processing site to a second tiered storage array of a failover processing site, wherein the volume is tiered with a first tiered organization in both the first and second tiered storage arrays;
direct a remote storage controller of the failover processing site stop tiering the volume on the second tiered storage array;
change the first tiered organization of the volume in the first tiered storage array to a second tiered organization;
direct the remote storage controller to change the first tiered organization of the volume in the second tiered storage array to the second tiered organization;
detect an event at the primary processing site;
initiate tiering of the volume by the second storage controller in response to the event;
change the second tiered organization of the volume in the second tiered storage array to a third tiered organization;
detect an end to the event at the primary processing site; and
change the second tiered organization of the volume in the first tiered storage array to the third tiered organization in response to detecting the end of the event.

15. The storage controller of claim 14, the processor further operable to:
direct the remote storage controller to change the first tiered organization of the volume in the second tiered storage array to the second tiered organization in response to changing the first tiered organization of the volume in the first tiered storage array.

16. The storage controller of claim 15, wherein directing the second storage controller to change the first tiered organization to the second tiered organization is performed in response to a first predetermined interval.

17. The storage controller of claim 14, wherein:
changing the first tiered organization comprises writing data to the volume;
the processor further operable to send the data to the remote storage controller.

18. The storage controller of claim 14, wherein the event includes at least one of a maintenance event and a failover event.

19. The storage controller of claim 14, the processor further operable to:
direct from the second storage controller that the first storage controller change the second tiered organization of the volume in the first tiered storage array to the third tiered organization in response to changing the second tiered organization of the volume in the second tiered storage array;
wherein changing the second tiered organization of the volume in the first tiered storage array to the third tiered organization is in response to the direction from the second storage controller.

20. The storage controller of claim 19, wherein directing the first storage controller to change the second tiered organization to the third tiered organization is performed in response to a second predetermined interval at the second storage controller.

* * * * *